US006473786B1

(12) United States Patent
Scouras et al.

(10) Patent No.: US 6,473,786 B1
(45) Date of Patent: Oct. 29, 2002

(54) DATA ACQUISITION AND REMOTE ADMINISTRATION SYSTEM

(75) Inventors: Gaetane A. Scouras, Webster, MA (US); Robert Hasselbaum, Worcester, MA (US)

(73) Assignee: Vitel Software, Inc., Worcester, MA (US)

( * ) Notice: Subject to any disclaimer, the term of this patent is extended or adjusted under 35 U.S.C. 154(b) by 0 days.

(21) Appl. No.: 09/328,538

(22) Filed: Jun. 9, 1999

Related U.S. Application Data (60) Provisional application No. 60/089,312, filed on Jun. 15, 1998.

(51) Int. Cl.[7] .............................................. G06F 15/16
(52) U.S. Cl. ...................... 709/206; 709/201; 709/202; 709/203; 709/204; 709/205; 709/206; 709/207; 707/200; 707/205; 706/246; 706/5.71; 379/67.1; 379/88.13; 379/88.17; 379/88.18; 379/86.22; 379/88.25; 395/604
(58) Field of Search ................................ 709/201–203, 709/227–228, 236, 246, 205–207, 204, 215, 200; 707/200, 205; 706/246, 5.71; 379/67.1, 88.13, 88.17–88.18, 88.22–88.25; 395/604

(56) References Cited

U.S. PATENT DOCUMENTS 5,243,643 A * 9/1993 Sattar ........................... 379/88
6,094,684 A * 7/2000 Pallmann ..................... 709/227

OTHER PUBLICATIONS

James K. Huggins "Kermit: Specification & Verification" Jul. 13, 1995.*

* cited by examiner

Primary Examiner—Mark H. Rinehart
Assistant Examiner—Hien C. Le
(74) Attorney, Agent, or Firm—Davis & Bujold, P.L.L.C.

(57) ABSTRACT

A data acquisition and remote administration system for use during a communication session between at least one client computer and a computerized voice mail server computer system with the at least one client computer and the voice mail server computer system each having a mechanism for establishing a communication link therebetween with the means for establishing a communication link including address and connection information necessary to establish the communication link. The client computer has an application component and includes a mechanism for logging into the voice mail server computer system, once the communication link is established, for authorizing access to information of the voice mail server computer system. Once access is authorized, the system has a mechanism for requesting information, stored in an internal data base of the voice mail server computer system via use of a KERMIT data transfer protocol. The voice mail server computer system receives the KERMIT data transfer protocol and compiles a data set from the internal data base of the voice mail server computer system and transmits the compiled data set to the client computer using the KERMIT data transfer protocol. The client computer includes a mechanism for receiving the complied data set from the voice mail server computer system and storing the complied data set in a temporary storage area prior to sending the received data set to the application component.

4 Claims, 7 Drawing Sheets

| LEVEL | PROTOCOL |
|---|---|
| Application | VARIES |
| Presentation | TCP |
| Session | IP |
| Transport | Not Specified |
| Network | |
| Physical | |

INTERNET PROTOCOLS

DATA ACQUISITION AND REMOTE ADMINISTRATION SYSTEM

This application claims the benefit of provisional application No. 60/089,312, filed Jun. 15, 1998.

FIELD OF THE INVENTION

The present invention relates to computer communications, and more particularly to improving data transfer rates when managing remote systems via computer communications.

BACKGROUND OF THE INVENTION

Communication between one computer and another is extremely important in today's society. Vast quantities of data and information are constantly being transferred from one location to another, with the need for improved computer communications methods growing as businesses and individuals become ever more dependent on receiving information and data as quickly and inexpensively as possible.

For communications between computers, the proper hardware (physical equipment) must be available. At a minimum, there must be at least two computers, each with the appropriate communications hardware. Typically, there are two communications methods. The first is where the two computers use modems to communicate via the phone lines. The first computer establishes a connection by having its modem dial the phone number of the modem attached to the second computer which, in turn, answers the call. This establishes a "circuit-switched connection", which simply means that there is a dedicated communication path between the two computers. The two computers then begin a communication session.

A variation of this first method uses what is known as a null modem cable, which physically links the two computers together so that they share a dedicated, direct path to one another. Communication over a null modem cable works the same way that modem based communication works from the viewpoints of the computers involved, except that no dial-up or call answering process is required. Both variations of this method are referred to as serial communications.

The second method for establishing the link requires both computers to be attached to a common data network based on, for example, the set of TCP/IP ("transmission control protocol/internet protocol") standards. Here, the first computer builds a connection to the second computer by "calling" the second computer on a prearranged network address and port. Network ports are roughly analogous to a set of different phone numbers that apply to a single computer at a given address, e.g. a server, which is typically a centralized computer containing a large storage of data which other computers access periodically. Having many different ports allow different programs running on the server, at the same time, to listen for connections without interfering with one another. The server accepts connections on specified ports, and the two computers begin a communication session. This method uses "packet switching" which, instead of serially transmitting data, transmits data in packets that are size-limited groups of data, each of which carries the associated destination address. Packet switching increases the efficiency of the communication between the computers.

Figure 1:
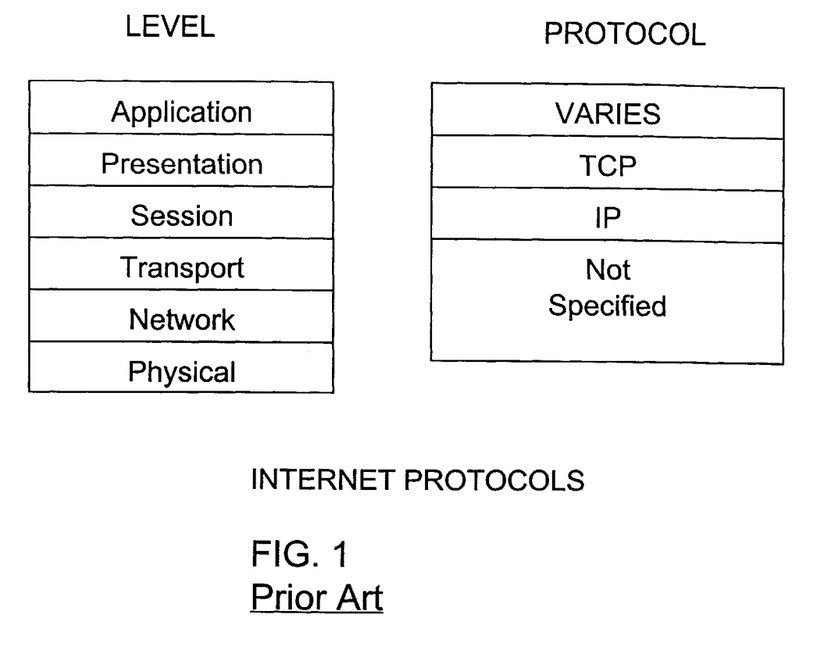
FIG. 1 is an OSI diagram of a known protocol hierarchy for a TCP/IP based computer communication.

FIG. 1 shows a known OSI diagram of the protocols for a common network, e.g. the INTERNET, that uses the TCP/IP protocols. The "levels" correspond to the hierarchy of layers in the computer communication process. At the top is the application level, which corresponds to the programs with which a user interacts with directly on a computer (a CAD program for example). The presentation level programs format one system's data so that it is compatible with another computer. At the session level, programs synchronize communications and manage the exchange of data. A number of different protocols are used at these levels with the communication performance varying accordingly.

The low-layer protocols, which coordinate the actual data transfer, exist below the session level. At the transport level, the TCP has methods for establishing virtual circuits, error correction, and information flow control. At the network level, the IP has methods for routing, ensuring that the data is transferred over the best path through the network and sub-networks. At the physical level, matters such as physical addressing, electrical characteristics (e.g. at what voltages a modem or network card sees a bit), and mechanical specifications are established, typically internally and proprietarily in the communications hardware.

One type of computer communication situation is where a user needs to download information from a voice-mail server computer to the user's "client" computer. The information can be system status data, administrative data (information about how many calls are received in each voice mailbox, cost summaries, statistical data, usage summaries, etc.), or the like. For large companies having large voice-mail systems, the information download time is often considerable, especially if older protocols and serial-based communication are employed.

One large scale telecommunication systems producer is Lucent Technologies ("Lucent"). Lucent markets several lines of corporate voice-mail system products for its many business customers. Quite often such customers require extensive voice-mail system reporting capabilities so that the support personnel can track system usage, respond to problems quickly, and plan for future expansion.

Figure 2:
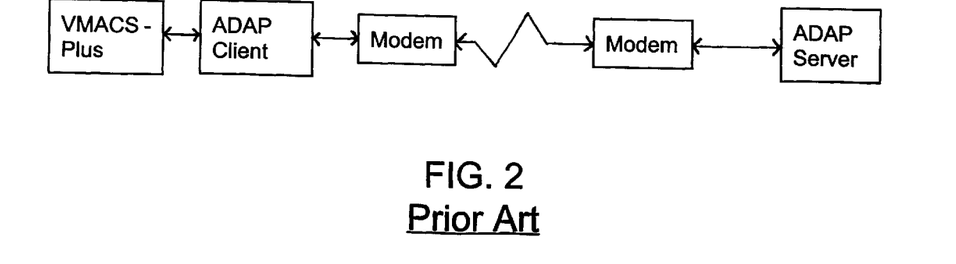
FIG. 2 is a simplified block diagram of a prior art data acquisition and remote administration system configuration.

This reporting capability can be implemented in a reporting/administration/database software package. For example, computer software sold under the trademark VMACS-Plus by Vitel Software Inc. of Worcester, Mass., provides this functionality. In the past, a software component developed by Lucent was used in conjunction with the VMACS-Plus software to collect raw data from the voice-mail systems for the reports. This "Administration and Data Acquisition Package" (ADAP) consists of a set of DOS-based programs that run on the client's computer and a corresponding server program that runs on the voice-mail computer system itself. The client (user)-side ADAP software would establish a dial-up connection to the voice mail machine, launch the server software, transfer the requested data from the server using the well known KERMIT file transfer protocol developed by Columbia University, and disconnect when finished. VMACS-Plus used the ADAP software to conduct a polling or communication session by calling the DOS executables with the necessary command line parameters to retrieve the necessary data. The outputs of these programs were then captured and parsed by VMACS-Plus for inclusion in its database. The relationship of the components in the system just described are illustrated in FIG. 2.

Although this method for collecting raw data functions reasonably, it is disadvantageous for three reasons:

1) The ADAP client supports only serial-based communication using a modem, which severely limits the speed at which VMACS can poll the voice-mail machines for their data. For large customers, it can often take hours to poll a single computer. The ADAP limitation exists despite the fact that most of the newer voice-mail servers are capable of communicating over faster TCP/IP based networks for peer coordination and maintenance purposes. p 2) ADAP, as a separate program, has to be installed in a user's computer in addition to the VMACS-Plus software. This complicates the installation process for a majority of users who do not need the acquisition software for any other reason, and also creates more expense. Also, since the ADAP client component is a DOS-based program, proper configuration is problematic under such operating systems as WINDOWS NT or other GUI based systems. p 3) Finally, the rudimentary DOS interface VMACS was required to use when calling the ADAP executables did not provide VMACS with a way to respond dynamically to different error conditions. In fact, any error(s) encountered during a polling session forced the VMACS software to abort the process and try again.

SUMMARY OF THE INVENTION

Wherefore, it is an object of the present invention to overcome the aforementioned problems and drawbacks associated with the prior art designs.

The Data acquisition and Remote administration System, according to the present invention, consists of a graphical user interface (GUI) application program, a client polling and administration (CPA) program on the user's computer, and a server polling and administration (SPA) program on the server computer. For a Lucent voice-mail system, the CPA replaces the old ADAP client programs. Instead of having an application communicating through ADAP, the system of the present invention has its own built-in advanced polling and administration program, thus streamlining and accelerating the entire communication process.

The system uses the KERMIT file transfer protocol in conjunction with TCP/IP based networks for enhanced data acquisition and transfer. A user (typically, a voice-mail system administrator or manager), via the application program, instructs the computer as to what information the user desires. The CPA establishes a TCP/IP network or serial connection and activates the SPA, which prepares the server to receive encoded instructions for data transfer operations or administrative command processing. In response to client commands embedded in KERMIT "file request" packets, the server compiles and sends requested data back to the client using the KERMIT data transfer protocol. In addition, the client can send server update commands in the form of specially formatted KERMIT files, allowing the user to change the operational configuration of the voice-mail system.

One feature of the present invention is that although products that collect voice mail system data and support remote administration using KERMIT have been developed in the past, the system according to the present invention is the first to provide this functionality over a TCP/IP network channel.

Another feature is that the present invention supports the use of long KERMIT packets, further increasing data polling and transfer performance.

Yet another feature is that the system, according to the present invention, can be used with both conventional serial dial-up methods as well as TCP/IP network connections. This results in increased flexibility for the user.

Another feature is that the present invention is directly compatible with Microsoft's WINDOWS operating systems, and, correspondingly, it offers a graphical user interface (GUI).

Another objective of the present invention is to eliminate Lucent's client-side ADAP program to thereby to streamline the communication process.

Yet another objective of the present invention is to provided a system which allows technical support personnel to examine polling transactions as they occur in order to help the technical support personnel more effectively troubleshoot configuration and equipment problems without going on-site. With an ADAP based system, for example, this detailed investigation was generally not possible.

Still another object of the present invention is to provide a system that can diagnose connection problems or server anomalies more effectively and respond dynamically thereto.

The present invention relates to a system for data acquisition and remote administration communications between at least one client computer and a voice mail server computer, the system comprising: the voice mail server computer having at least one internal database having at least one data record; the at least one client computer and the voice mail server computer each having communication means for establishing a communications link and transferring information to each other; the at least one client computer having data acquisition means for transmitting to the server computer, once the communications link has been established by the communication means, a request for information including at least one identifier of at least one of the data records stored in an internal data base of the voice mail server computer system via use of a KERMIT data transfer protocol; and the voice mail server computer system having means for receiving request via the KERMIT data transfer protocol from the at least one client computer and file compilation means for compiling a file composed of a data set of the identified data records and sending the file via the communication means to the at least one client computer using the KERMIT data transfer protocol.

The present invention also relates to a computer executable software code stored on a computer readable medium, the code for remotely administering and acquiring data from a voice mail server computer having at least one internal database having at least one data record and at least one modifiable operational parameter by which the operation of the database is governed, the code comprising: code, responsive to a command provided by an application upon the input of at least one of a requested database record and an administrative command, the administrative command having at least an identification of which modifiable operational parameter to modify and data for modifying the parameter, to establish a communications link to the voice mail server for transferring information according to a KERMIT protocol; code, responsive to the application requesting the at least one database record, to transmit to the voice mail server computer, once the communications link has been established, at least one identifier of at least one of the data records to be sent by the voice mail server, the at least one identifier being in a KERMIT receive file request packet; and code, responsive to the application providing the at least one administrative command, to transmit to the voice mail server, once a communications link has been established, i) at least one KERMIT send initiation packet to alert the voice mail server that an administrative command is going to be sent, ii) at least one KERMIT file header packet containing the identification of which modifiable operational parameter to modify, and iii) at least one KERMIT file data packet containing the data for modifying the parameter.

BRIEF DESCRIPTION OF THE DRAWINGS

The invention will now be described, by way of example, with reference to the accompanying drawings in which.

DETAILED DESCRIPTION OF THE INVENTION

Figure 3:
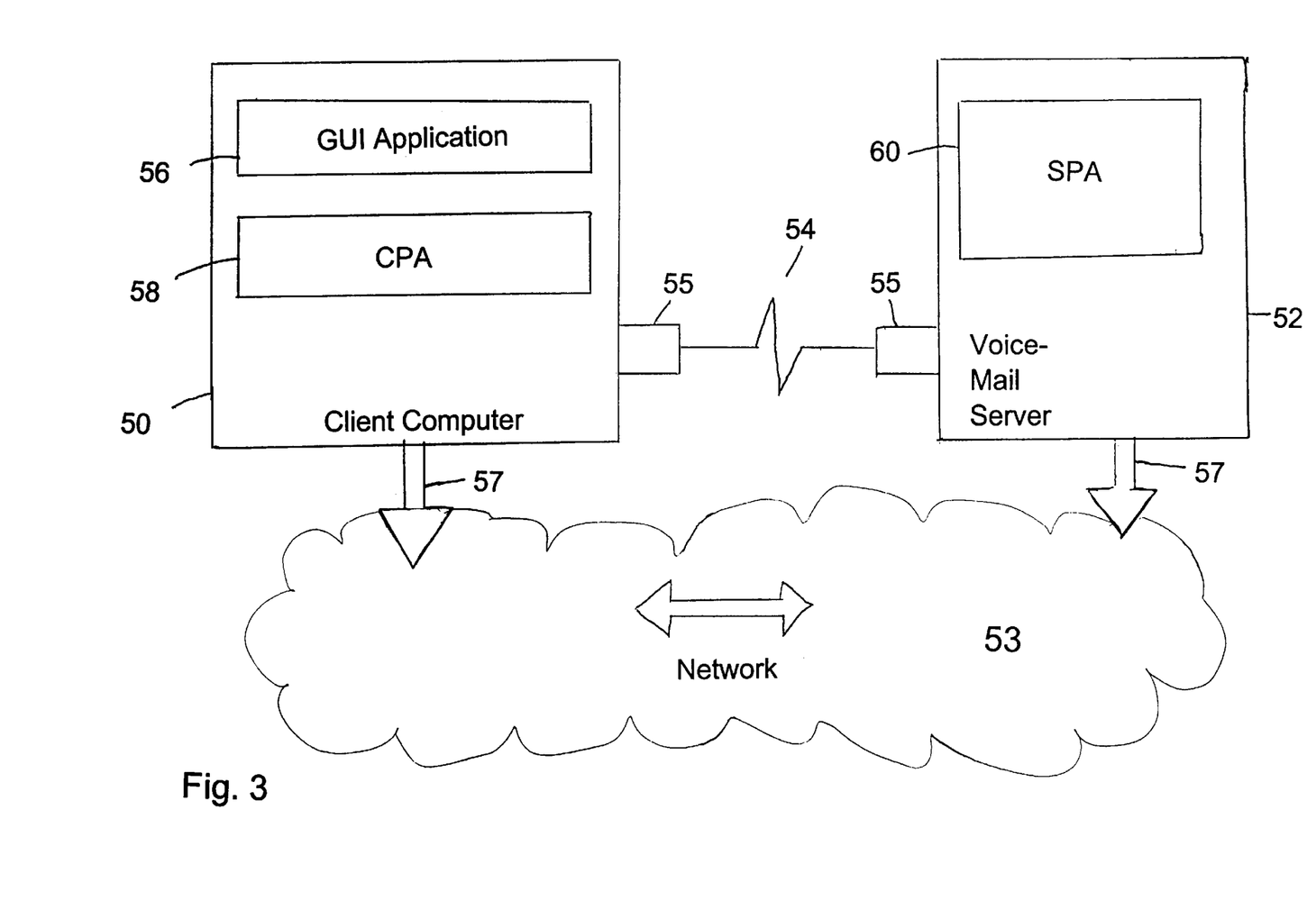
FIG. 3 is a simplified block diagram of the data acquisition and remote administration system configuration according to the present invention.

For the system according to the invention, a simplified diagram of which is shown in FIG. 3, a user having a client computer 50 desires to retrieve data and administration information from a voice-mail system server computer 52, which is typically connected to other computers (not shown in further detail) in a network 53. To enable the communication process, some sort of link is necessary between the two computers. This link can be a direct serial communication link 54 using two modems 55, but is preferably a TCP/IP based network connection 57.

Three independent software components are required to support the Data Acquisition and Remote Administration System according to the present invention. An application software component 56 runs on the client computer 50 and provides a user interface that allows the user to specify which sets of data the user would like to retrieve and which commands the user would like the remote voice-mail server to execute. The application software component is preferably provided as a GUI.

A client polling and administration (CPA) software component 58 also runs on the client computer 50, alongside the application software component 56. When called upon by the application software component 56, the CPA software component 58 establishes a connection to a specified voice-mail server computer 52, logs into the server, directs the server to send the data sets requested by the user, and transmits any administrative commands specified by the user to update the servers current settings. The CPA software component 58 also provides a user interface that indicates the current status of the communication session. When used with a Lucent voice-mail system, for example, the system according to the invention eliminates the client-side ADAP programs which had assumed this role.

A server polling and administration (SPA) software component 60 is a program that runs on the server computer 52 and responds to incoming client requests by delivering the appropriate data across the link 57 and executing the administrative commands sent by the client computer 50. The polling and administration software components 58, 60 interact with one another using KERMIT. On a Lucent voice-mail system, the SPA software component 60, already built into the server computer 52, can only communicate via the KERMIT protocol (originally included because of its advantages in serial modem-to-modem communication), necessitating KERMIT's use across the TCP/IP connection.

When a communication session begins, the application software component 56 activates the CPA software component 58. Flow charts showing the polling and administrative processes for the CPA software component 58 and SPA software component 60 are shown in FIGS. 4–8. The application software component 56 furnishes, from its own internal database, the CPA software component subsystem with the address and connection information necessary to set up a communication link with the desired server. The application software component 56 also passes along a list of data sets to be retrieved and administrative commands to be executed during this communication session, which is acquired from the user.

Figure 4:
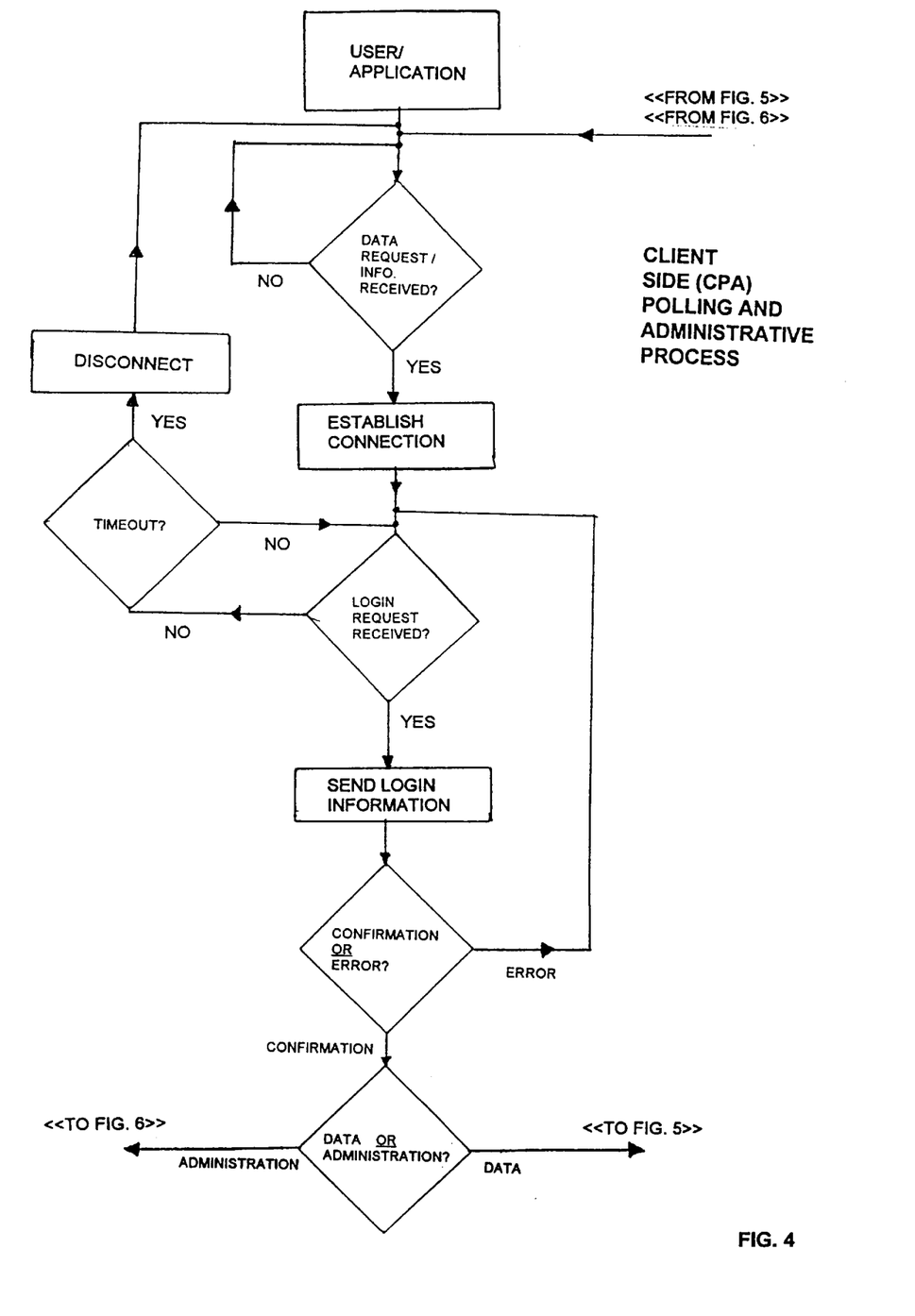
FIG. 4 is a simplified flow chart depicting a first portion of a client side (CPA) polling and administrative process.

Once all the data request and administrative commands are received by the CPA software component 58 (step 100), the CPA software component 58 then takes over and attempts to establish a connection to the server computer 52 (step 102). This is done with communications means provided in the client computer. For example, if a serial connection is specified, the client computer 50 uses its modem to dial the server computer's modem, or the client computer 50 opens a connection through a null modem cable. If a network connection is specified, the client computer 50 connects to the prearranged TCP/IP port on the server computer 52 via code that controls a network adaptor card or a modem connection to a network service provider. This provides a virtual pipe for data transfer between the two computers for the duration of the session.

In communicating via TCP/IP, the CPA must interact with an application programming interface (API) that differs from the one used to communicate directly over a modem. Specifically, the CPA uses the WINDOWS socket ("Winsock") API written by Microsoft to manage TCP/IP connections. Winsock provides the facilities to create and destroy TCP/IP connections, and send and receive data over those connections. To manage connections over a modem line, the CPA must use a different API with different semantics when interacting with the operating systems.

To create a network connection, the CPA (using Winsock) sends a packet over the attached network 53 (see FIG. 3) to the remote server 52, specifying the server's IP address and server software port. The packet specifies that the client computer 50 wishes to establish a connection. Once the connection is set up, the two machines communicate by embedding application data in TCP/IP packets, which are sent and received over the network. This "embedding" process does not occur in the modem-based case, where the application data is sent over the line in raw form. Finally, the TCP/IP based connection is released through a specific protocol defined in the standard. Of course, an API other than Winsock could be used.

Once the connection channel has been opened (step 104; see FIG. 7), the CPA software component 58 logs into the voice-mail computer by transmitting an authorized account name and password (step 106) in response to the server computer's 52 prompts (step 108) for this information. If no login request is received after a certain period of time, the CPA software component 58 will terminate the current communications session and try again (step 109.) If the server computer 52 accepts the user name and password (step 110), the CPA will either begin sending administrative commands or data requests, depending on what has been received from the application software component 56 (step 111). Although these tasks may be performed in any order, typically data requests are carried out first. Regardless of what is done first, though, the CPA software component 58 will sends a command to activate the SPA software component 60 (step 112; see FIGS. 5 & 6). This prepares the server computer 52 to receive encoded instructions for data transfer operations or administrative command processing. The SPA software component resets if the communication link is disconnected for some reason (step 113; see FIG. 7.)

As previously mentioned, in the presently preferred embodiment of a data acquisition and remote administration system, the server computer 52 communicates with the client computer 50 using the KERMIT data transfer protocol. As has been described herein above and as is described in the public KERMIT specifications, the KERMIT data transfer protocol allows-information to be exchanged between two systems by means of KERMIT packets wherein each packet contains packet formatting information and a "payload", which is the information content of the packet. As is well understood, the KERMIT protocol typically supports both "basic" and "long" packets wherein all systems supporting the KERMIT protocol will support at least the use of "basic" packets while some systems will also support "long" packets. As will be described in the following, the presently preferred implementation of a of a data acquisition and remote administration system utilizes basic packets for certain information exchanges required by the present invention, such as the initialization and control of the transfer of data or administrative commands. The presently preferred embodiment of the invention, however, allows the use of KERMIT long packets for the transfer of actual data, if a given system supports the use of long packets, and uses basic packets for the transfer of data in those systems which do not support the use of long packets. For this reason, the following discussions will focus on operations using the basic KERMIT packets as the modifications to the data transfer operations to use long KERMIT packets for data transfers will be well understood by those of ordinary skill in the arts.

In this regard, both basic and long packets are described and defined in the public KERMIT specifications and, as such, will not be described extensively herein. For the convenience of the reader, however, the general format for a basic KERMIT packet is defined as comprising, from beginning to end, (a) a start delimiter, of one byte, (b) a packet length +32, of one byte, (c) a packet type, of one byte, (d) a payload, of one to approximately 80 bytes, (e) a checksum +32, of one byte, and (f) and end delimiter, of one byte.

Figure 5:
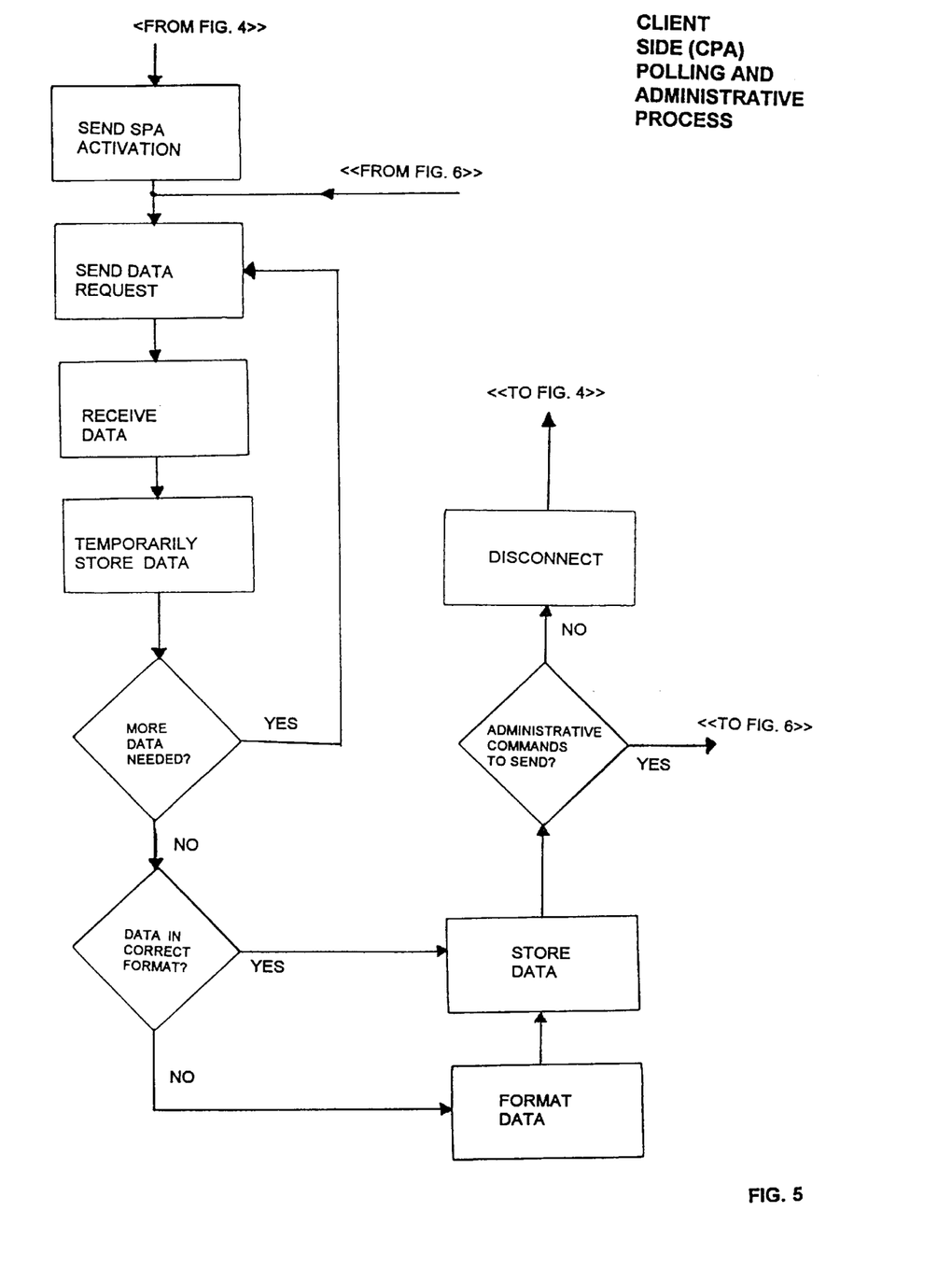
FIG. 5 is a simplified flow chart depicting a second portion of the client side (CPA) polling and administrative process.

First considering the retrieval of data sets from a server computer 52 to a client computer 50 according to a list provided by the application software component 56, the CPA software component 58 sends an encoded request string (step 114) embedded in a KERMIT "receive file request" packet, as shown in FIG. 5. The encoded request string corresponds to a particular data set or record (or portion thereof) stored in the server computer's 52 database.

Normally, a KERMIT "receive file request" packet will contain the filename of a file that a client wishes to receive from a server. For example, if a file called "myfile.txt" existed on the server and the client wanted to retrieve it, the client would refer to the file by that name in the "receive file request" packet. In the present invention, on the other hand, when the client sends a "receive file request" packet, the "filename" specified is not really a filename at all. It is a command string that identifies the records in the database that the client wishes to retrieve. Hence, the client computer's packet tells the server computer 52 that the client computer 50 wishes to receive a file or files containing the data sets or records identified by the encoded request string. An example of a typical "receive file request" packet may appear as: <ASCII 1>X R#H;;#B#Clist measurements network-load day 05/05/99%<ASCII 13>, wherein the payload is the command string that defines the data set requested by the client computer 50.

Once the server computer 52 receives the client computers request for a data set (step 116; see FIG. 8), the server computer 52 and-client computer 50 exchange basic packets containing the information necessary for the server computer 52 and the client computer 50 to agree upon and establish the parameters by which the data transfer will be executed. This exchange is controlled by the KERMIT protocol and is: essentially a standard overhead operation that is not a defining part of the present invention. According to this procedure, the server computer 52 responds to the receiving of the client computer 52 request for a data set by transmitting a "send initialization packert" to the client computer 50 wherein the "send initialization packet" contains bids for different transfer parameter options that the server computer 52 will support. "Send initialization packets" are standard KERMIT protocol packets and each byte in such a packet is defined in the public KERMIT specifications. For purposes of illustration, however, a typical "send initialization packet" may appear, for example, as <ASCII 1>+Sp\ -#N9<ASCII 13>. The client computer 50 will respond by transmitting an acknowledgment packet, which again is a standard KERMIT protocol basic packet containing the client computer 50 bits for transfer parameter options that the client computer 50 can support. For purposes of illustration, a typical "send initialization packet " may appear, for example, as <ASCII 1>+Yp\ -#N9w<ASCII 13>. The server computer 52, upon receiving the client computer 50 acknowledgment packet, will select a set of transfer parameters that can be supported by both systems, and will begin operation using those parameters.

Figure 8:
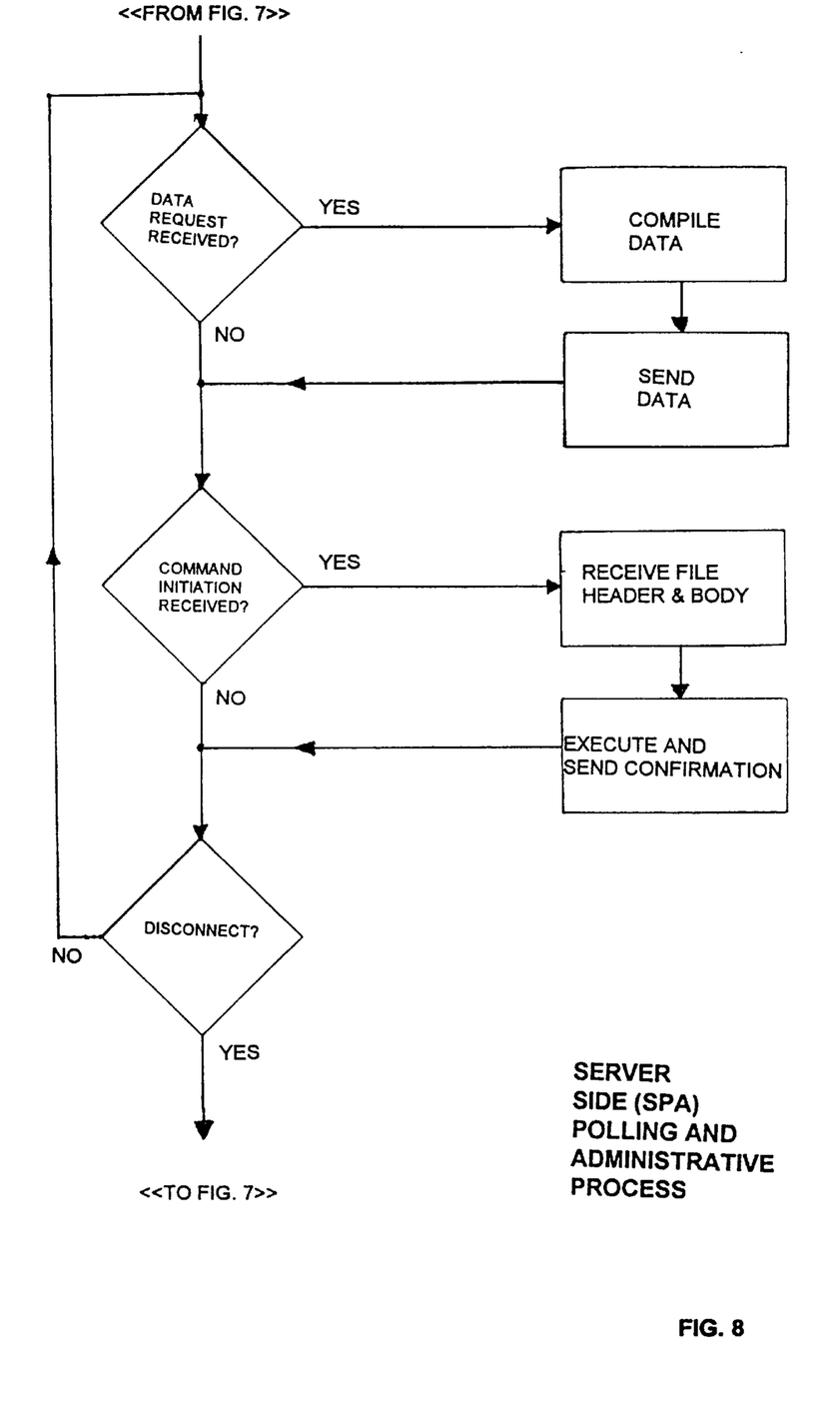
FIG. 8 is a simplified flow chart depicting a second and final portion of the client side (CPA) polling and administrative process.

The server computer 52 will respond to the client computer 50 request for a data set by compiling the relevant data from its own internal database (step 118) and transmitting the data set (step 120) as a file using the rules for the transfer defined in the KERMIT specification protocol and as implemented according to the present invention. According to the present invention, the server computer 52 will first transmit a "file header" packet, wherein the "payload" of the file header packet repeats the command string that was contained in the "receive file request" packet corresponding to the data transfer initiated by that file header packet. In the case of the above example of a "receive file request" packet, therefore, the corresponding "file header" packet may appear, for example, as <ASCII 1>X?F#H;;#B#Clist measurements network-load day 05/05/99v<ASCII 13>. The file header packet thereby identifies which data set will be transferred from the server computer 52 to the client computer 50 in the current transaction, but is otherwise essentially ignored in the present implementation of the CPA software component 58.

The client computer 50, in the present embodiment, will respond to a file header packet by a "file header acknowledgment" packet wherein the payload of this acknowledgment packet is normally intended to identify the file name-the client computer 50 will store a file in. In the present invention, however, and because the system of the present invention is not actually transferring files, a dummy file name is hard coded into the acknowledgment to meet the protocol requirements. As such, a file header acknowledgment packet may, for example, appear as <ASCII 1>&?Ystdouthn<ASCII 13>. After receiving the file header acknowledgment packet, the server computer 52 will transmit the data set to the client computer 50 in one or more basic or long KERMIT "file data" packets, an example of which might be, for the basic packet format. <ASCII 1>i"D19990505,2359,0,1,534,24,2476,23,11,213,0,0,0,54, 53,0,35, "local",32,23{<ASCII 13>. The number of "file data" packets will depend upon the size of the data set, and whether the basic for long packets are being used to transmit the data set. In addition, it should be noted that the fields are typically separated using, for example, the comma character while the records are typically separated using, for example, an end-of-line delimiter. The client computer 50 will respond to each such data set packet by transmitting a data set acknowledgment packet wherein the payload of the packet is blank, the packet serving to satisfy the KERMIT protocol by acknowledging the receipt of a transmission and having the form, for example, of >ASCII 1>#Y3<ASCII 13>.

It should be noted that if no data request is immediately received by the server computer 52, the SPA software component 60 waits until one is received, the line is disconnected (step 121), signifying the end of a communication session, or a command initiation for an administrative command is received (step 200). On the other side, the client computer 50 receives the data (step 122) and saves the incoming data to a temporary storage area as it arrives (step 124).

After the client computer 50 receives the entire file, the client computer 50 may issue'subsequent "receive file request" packets for additional data sets or additional portions of the same data set, if needed (step 126). This new data is transferred by the server computer 52 in the same fashion indicated above.

A series of files stored on the client computer 50, one file per data set, serves as the output of the data acquisition operation. The fields and records for each file must be separated from one another by predefined delimiter strings that are universal across all files. In addition, files corresponding to the same type of data set for different types of voice-mail servers must be arranged with the fields in the same order: However, not all implementations of the voice mail server SPA software component 60. provide data via KERMIT in a form that meets these requirements. Therefore, the CPA software component 58 checks the formatting (step 128) of the data sets, as they are received, and reformats data sets (step 130) that do not comply before releasing the data to the application software component 56.

To perform the reformatting operation, the CPA software component 58 reorders fields that do not match the predefined sequence for a data set and inserts standard delimiter strings between each field and record in a data set. Then, the CPA software component 58 stores the resulting files on the client computer's local storage medium for processing by the application software component 56 (step 132).

Figure 6:
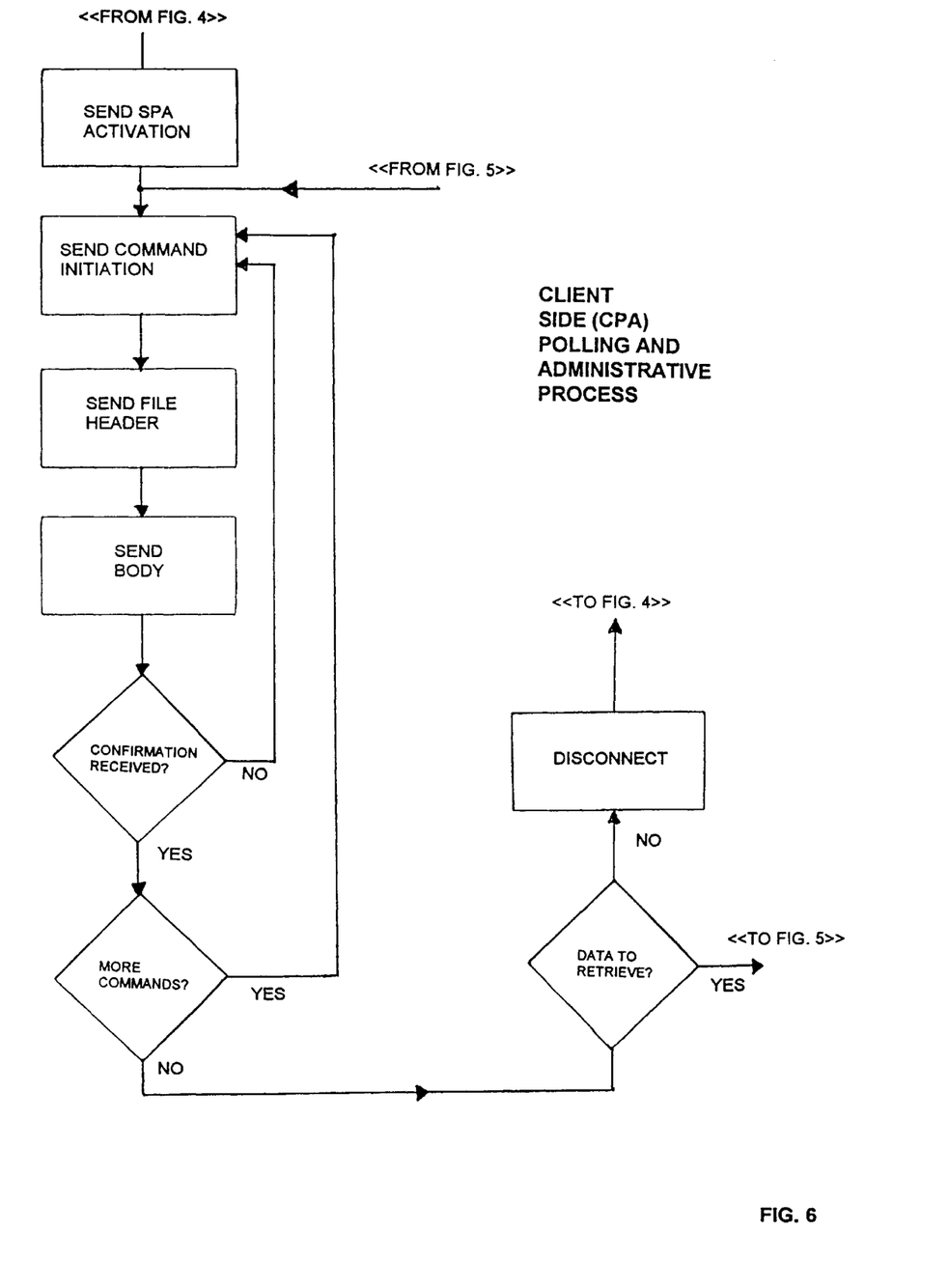
FIG. 6 is a simplified flow chart depicting a third and final portion of the client side (CPA) polling and administrative process.
Figure 7:
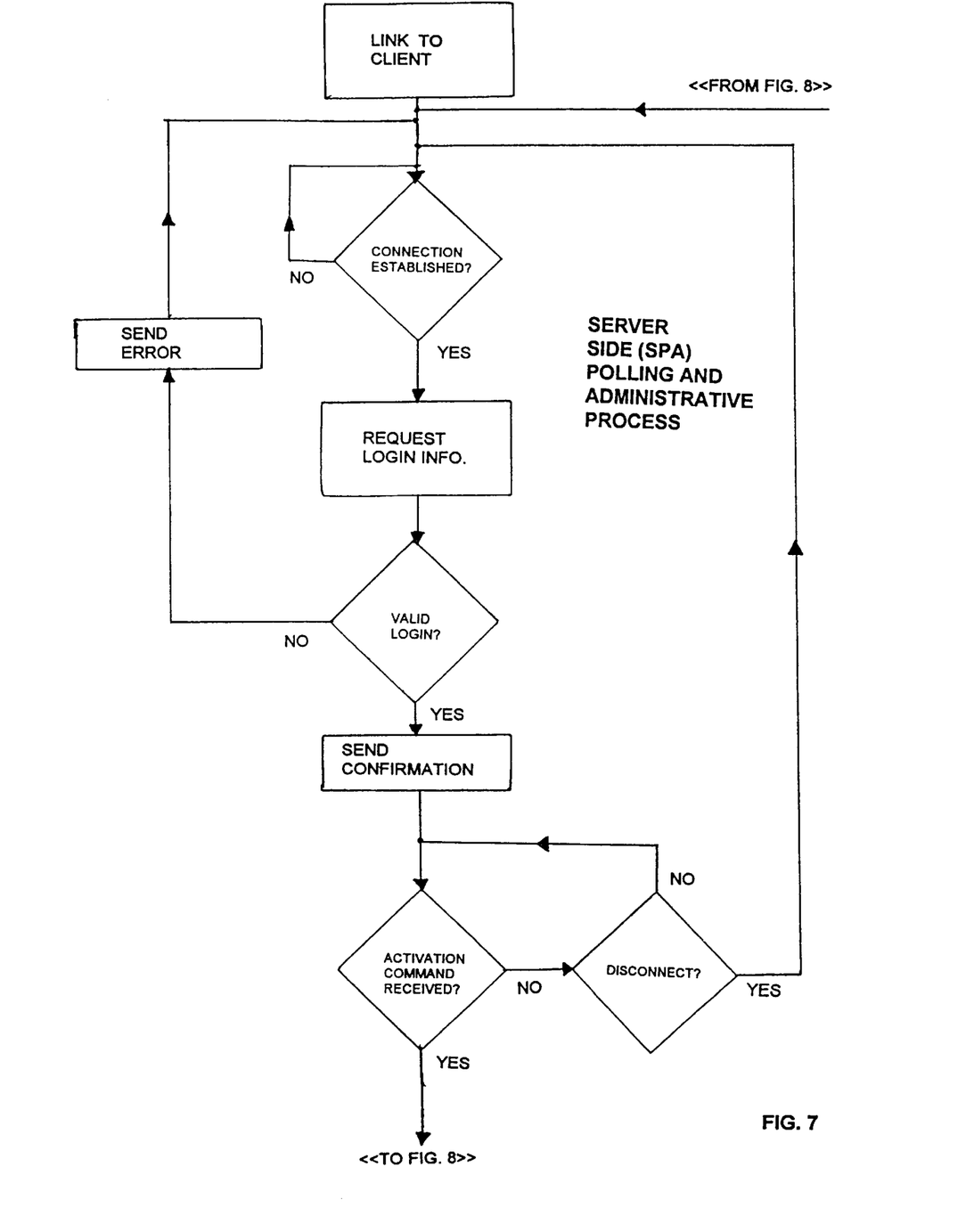
FIG. 7 is a simplified flow chart depicting a first portion of a server side (SPA) polling and administrative process.

Once the data transfer is finished, the CPA software component checks to see if there are any administrative commands to be sent (step 133.) If not, the communications session is terminated (step 134.) For remote administration, the CPA software component 58 reads the list of administrative commands to be executed on the server computer 52 that was provided by the application software component 56. Each command corresponds to a desired change in one or more voice mail server modifiable operational parameters, which govern the operation of the database. The client computer 50 will send each command as a KERMIT file.

To issue a command, the client computer 50 transmits a "send initiation" packet (step 200) followed by a "file header" packet (step 202) as shown in FIG. 6 (note that since an SPA activation was sent (step 112) during the data request session, as described above, it Would not be necessary to resend an SPA activation here.) The "send initiation" packet informs the server that the client will be sending a "file header" packet indicating which operational parameter(s) to change (a first administrative data set), followed by the actual "file data" packet(s) that contain the new operational parameter data (a second administrative data set.) The "file header " packet, which the client computer 50 sends to identify the name of the file it wishes to transmit, contains an encoded command string that corresponds to a valid administrative command (i.e. change in operational parameters) recognized by the server computer 52.

Having now declared the server computer command to be executed via the "file header" packet, the client CPA software component 58 sends the "body" of the file as a series of "file data" packets (step 204). The file data sent represents the new configuration parameters intended to replace or add to data, in the server computer's configuration profile, which contains the modifiable operational parameters. In other words, the "file header" packet tells the server computer what operational parameters to change, and the "file data" packets tell the server computer to what to change them to.

Upon receipt of the command identifier and associated parameters (step 206; see FIG. 8), the server SPA software component 60, having code for this purpose, executes the command and returns a positive acknowledgment, via KERMIT, if the execution was successful (step 208). If the execution was unsuccessful, the CPA software component 58 may try to send the command again (step 210).

The CPA software component 58 sends additional administrative commands, if needed (step 212). The subsequent commands are communicated and acknowledged by the SPA software component 60 in the same fashion as noted above.

The CPA software component 58 ends the polling and remote administration session by simply disconnecting from the server computer 52 in a conventional manner (step 134), unless there is still data to retrieve (step 135). In the case of a serial link, the CPA software component 58 code directs the modem to hang up. In the case of a network connection, the CPA software component 58 closes the connection using the disconnection routine defined for the TCP transport. Note that these disconnection procedures apply to all disconnection or communications termination steps noted herein.

All the software components of the present invention, as described above, can be implemented in any desired programming language according to any desired programming style or methods. The software components can be stored as code in any type of computer readable memory medium, including, for example, hard disks, floppy disks and programmable memory chips, among others. For use, the software component code is typically loaded into the computers random access memory (RAM). This can be done, for example, by copying the code from the computer readable memory medium, or by directly programming the code into the computers RAM. Since such procedures are known to those with skill in the computer and programming arts, further detail will not be provided herein.

Attached, as Appendix, is the source code listing for software for use in connection with the present invention.

Since certain changes may be made in the above described data acquisition and remote administration system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for data acquisition and remote administration communications between at least one client computer and a voice mail server computer, the system comprising:

the voice mail server computer having at least one internal database having at least one data record;

the at least one client computer and the voice mail server computer each having communication means for establishing a communications link and transferring information to each other;

the at least one client computer having data acquisition means for transmitting to the server computer, once the communications link has been established by the communication means, a request for information including at least one identifier of at least one of the data records stored in an internal data base of the voice mail server computer system via use of a KERMIT data transfer protocol; and the voice mail server computer system having means for receiving request via the KERMIT data transfer protocol from the at least one client computer and file compilation means for compiling a file composed of a data set of the identified data records and sending the file via the communication means to the at least one client computer using the KERMIT data transfer protocol;

the at least one internal database has at least one modifiable operational parameter by which the operation of the database is governed;

the at least one client computer having administration means for transmitting to the server computer, once a communications link has been established by the communication means, at least one administrative command for initiating a change in the at least one operational database parameter;

the voice mail server computer system having configuration means, responsive to the administrative command sent by the administration means, for changing the at least one operational parameter and thereby the operational configuration of the database;

the communications means transfer information according to a KERMIT protocol;

the administrative command comprises a first administrative data set indicating which operational parameters to change and a second administrative data set contain new operational parameter data;

the configuration means are initiated by the administration means sending at least one KERMIT send initiation packet;

the first administrative data set is sent by the administration means in a KERMIT file header packet; and the at least one operational parameter is changed by the configuration means according to the second administrative data set sent to the voice mail server by the administration means in at least one KERMIT file data packet.

2. A system for data acquisition and remote administration communications between at least one client computer and a voice mail server computer, the system comprising:

the voice mail server computer having at least one internal database having at least one data record;

the at least one client computer and the voice mail server computer each having communication means for establishing a communications link and transferring information to each other;

the at least one client computer having data acquisition means for transmitting to the server computer, once the communications link has been established by the communication means, a request for information including at least one identifier of at least one of the data records stored in an internal data base of the voice mail server computer system via use of a KERMIT data transfer protocol;

the voice mail server computer system having means for receiving request via the KERMIT data transfer protocol from the at least one client computer and file compilation means for compiling a file composed of a data set of the identified data records and sending the file via the communication means to the at least one client computer using the KERMIT data transfer protocol; and the at least one client computer has means for separating the data set in each received compiled file into a field and the record which are separated from one another by predefined delimiter strings which are universal across all files, and further includes means for reformatting data sets which are non-conforming.

3. The data acquisition and remote administration system according to claim 2, wherein the at least one client computer has means for reformatting each non-conforming data set so that each field matches a predefined sequence for a data set and includes the predefined delimiter string between each field and record of the data set.

4. A system for data acquisition and remote administration communications between at least one client computer and a voice mail server computer, the system comprising:

the voice mail server computer having at least one internal database having at least one data record and at least one modifiable operational parameter by which the operation of the database is governed;

the at least one client computer and the voice mail server computer each having communication means for establishing a communications link and transferring information to each other;

the at least one client computer having administration means for transmitting to the server computer, when a communications link has been established by the communication means, at least one administrative command for initiating a change in the at least one operational database parameter;

the voice mail server computer system having configuration means, responsive to the database change command sent by the administration means, for changing the at least one operational parameter and thereby the operational configuration of the database;

the communications means transfers information according to a KERMIT protocol;

the configuration means are initiated by the administration means sending at least one KERMIT send initiation packet;

the administrative command comprises a first administrative data set indicating which operational parameters to change and a second administrative data set contain new operational parameter data;

the first administrative data set is sent by the administration means in a KERMIT file header packet; and the at least one operational parameter is changed by the configuration means according to the second administrative data set sent to the voice mail server by the administration means in at least one KERMIT file data packet.

* * * * *